United States Patent [19]
Yamamoto et al.

[11] Patent Number: 5,534,233
[45] Date of Patent: Jul. 9, 1996

[54] LIQUID FLOW CONTROL DEVICE, REACTOR USING SAME AND LIQUID FLOW CONTROL METHOD

[75] Inventors: Osamu Yamamoto, Kawasaki; Seiya Hirohama; Ryuichiro Kajiyama, both of Yokohama; Yoshikazu Shimoyama, Kawasaki; Junichiro Tanaka, Yokohama, all of Japan

[73] Assignee: Chiyoda Corporation, Yokohama, Japan

[21] Appl. No.: 355,485

[22] Filed: Dec. 14, 1994

[30] Foreign Application Priority Data

Dec. 15, 1993 [JP] Japan ................................. 5-343118

[51] Int. Cl.6 ....................................... B01J 8/04
[52] U.S. Cl. ..................... 422/191; 422/194; 422/195; 422/220; 422/236; 261/97
[58] Field of Search ................................ 422/191, 194, 422/195, 220, 236; 366/66; 261/97

[56] References Cited

U.S. PATENT DOCUMENTS

| | | | |
|---|---|---|---|
| 3,233,660 | 2/1966 | Neltel et al. | 165/4 |
| 3,480,407 | 11/1969 | Wentworth et al. | 422/195 |
| 3,592,612 | 7/1971 | Ballard et al. | 422/195 |
| 3,787,189 | 1/1974 | Multal et al. | 422/195 |
| 3,916,021 | 10/1975 | Hajek et al. | 261/97 |
| 5,152,967 | 10/1992 | Rossetti et al. | 422/194 |
| 5,403,560 | 4/1995 | Deshpande et al. | 422/190 |

*Primary Examiner*—N. Bhat
*Attorney, Agent, or Firm*—Armstrong, Westerman, Hattori, McLeland & Naughton

[57] ABSTRACT

A device for controlling a liquid flow in a vertically extending pipe is disclosed which includes a plate member horizontally disposed in the pipe for receiving the liquid flow thereon and having an opening to permit the liquid received on the plate member to pass therethrough, a tubular guide downwardly inwardly extending from the periphery of the opening and terminating to form a liquid outlet, and a plurality of partition plates disposed on the tubular guide. Each partition plate has an upper end upwardly protruding from the periphery of the opening and a lower end obliquely downwardly extending from the periphery of the opening along the wall of the tubular guide member, so that a plurality of discrete passages are defined on the tubular guide. A cover plate is provided to cover the passages so that the liquid received on the plate member flows through the passages and is discharged from the liquid outlet of the tubular guide to form a vortex flow.

11 Claims, 17 Drawing Sheets

5,534,233

LIQUID FLOW CONTROL DEVICE, REACTOR USING SAME AND LIQUID FLOW CONTROL METHOD

BACKGROUND OF THE INVENTION

This invention relates to a flow control device for uniforming a liquid flow and to a liquid flow controlling method. The present invention also pertains to a reactor using such a control device.

A flow control device such as a porous plate, a perforated plate, a chimney-type distributing plate or a bubble cap-type distributing plate is generally disposed within a vertically extending pipe for the purpose of uniformly radially (horizontal direction normal to the axis of the pipe) distributing a liquid flowing down therethrough. While the known flow control device can uniformly horizontally distribute the liquid flow, the use thereof is ineffective for homogeneously mixing the liquid. Thus, when the liquid flow is formed from streams having different concentrations, different temperatures or different compositions, the liquid flow controlled upon passage of the control device still remains non-uniform in its quality. For example, when the fluid flow is a gas-containing liquid, the known control device cannot effect homogeneous gas-liquid contact so that the absorbed gas/liquid ratio of the liquid flow discharged therefrom still varies in the horizontal direction. Similarly, the fluid flow composed of a high temperature liquid and a quenching gas injected thereinto still varies in temperature in the horizontal direction even upon the passage of the known control device.

Japanese patent publication JP-B-42-24284 proposes a device including a plate adapted to receive a liquid flow and having a center portion provided with two openings, and a hollow box connected to the lower side of the plate to collect the liquid introduced through the openings and having a bottom portion provided with two outlets. With this device, the liquid flow is received on the plate, then introduced into and collected in the box and then discharged from the outlets. Since the liquid is subjected to a mixing operation during its passage in the box, the liquid discharged from the outlets has an improved homogeneity. However, the mixing efficiency is not fully satisfactory. Moreover, the dynamic energy of the liquid entering and flowing in the box causes vibration of the box so that breakage of the box is caused unless a well reinforced structure is used for therefor.

SUMMARY OF THE INVENTION

In accordance with one aspect of the present invention there is provided a device for controlling a liquid flow in a generally vertically extending pipe, comprising:

a plate member arranged to be generally horizontally disposed in said pipe for receiving the liquid flow thereon and having an opening so that the liquid received on said plate member is permitted to pass said plate member only through said opening;

a tubular guide member downwardly inwardly extending from the periphery of said opening and terminating to form a liquid outlet having an area smaller than that of said opening;

a plurality of partition members each having a lower end connected to said tubular guide member and each having an upper end upwardly protruding from the periphery of said opening, said lower end of each of said partition members obliquely downwardly extending from the periphery of said opening along the wall of said tubular guide member to define on said tubular guide member a plurality of passages corresponding in number to the number of said partition members and being in fluid communication with said liquid outlet; and a cover plate member provided to cover said plurality of passages, so that the liquid flow is received on said plate member, flows through said passages and is discharged from said liquid outlet to form a vortex flow.

In another aspect, the present invention provides a reactor comprising upper and lower catalyst beds, and the above flow control device interposed between said upper and lower catalyst beds, whereby the liquid flow discharged from said upper catalyst bed is distributed by said device and then introduced into said lower catalyst bed.

The present invention also provides a method of controlling a liquid flow in a generally vertically extending pipe, comprising receiving the liquid flow on a plate member having an opening, and converting said liquid flow into a vortex flow discharged from said opening.

It is an object of the present invention to provide a liquid flow control device which can efficiently distribute and mix the liquid flow.

Another object of the present invention is to provide a liquid flow control device of the above-mentioned type which does not cause a problem of vibration and breakage thereof.

It is a further object of the present invention to provide a flow control device of the above-mentioned type which is advantageously used in various types of liquid-liquid and gas-liquid contacting apparatus.

It is a further object of the present invention to provide a flow control device of the above-mentioned type which can evenly distribute the liquid flow into a multiplicity of streams having substantially the same volume and composition.

It is yet a further object of the present invention to provide a method for controlling a liquid flow.

It is a special object of the present invention to provide a reactor having a flow control device of the above-mentioned type.

BRIEF DESCRIPTION OF THE DRAWINGS

Other objects, features and advantages of the present invention will become apparent from the detailed description of the preferred embodiments of the invention which follows, when considered in light of the accompanying drawings, in which.

DETAILED DESCRIPTION OF THE PREFERRED EMBODIMENTS OF THE INVENTION

Figure 5:
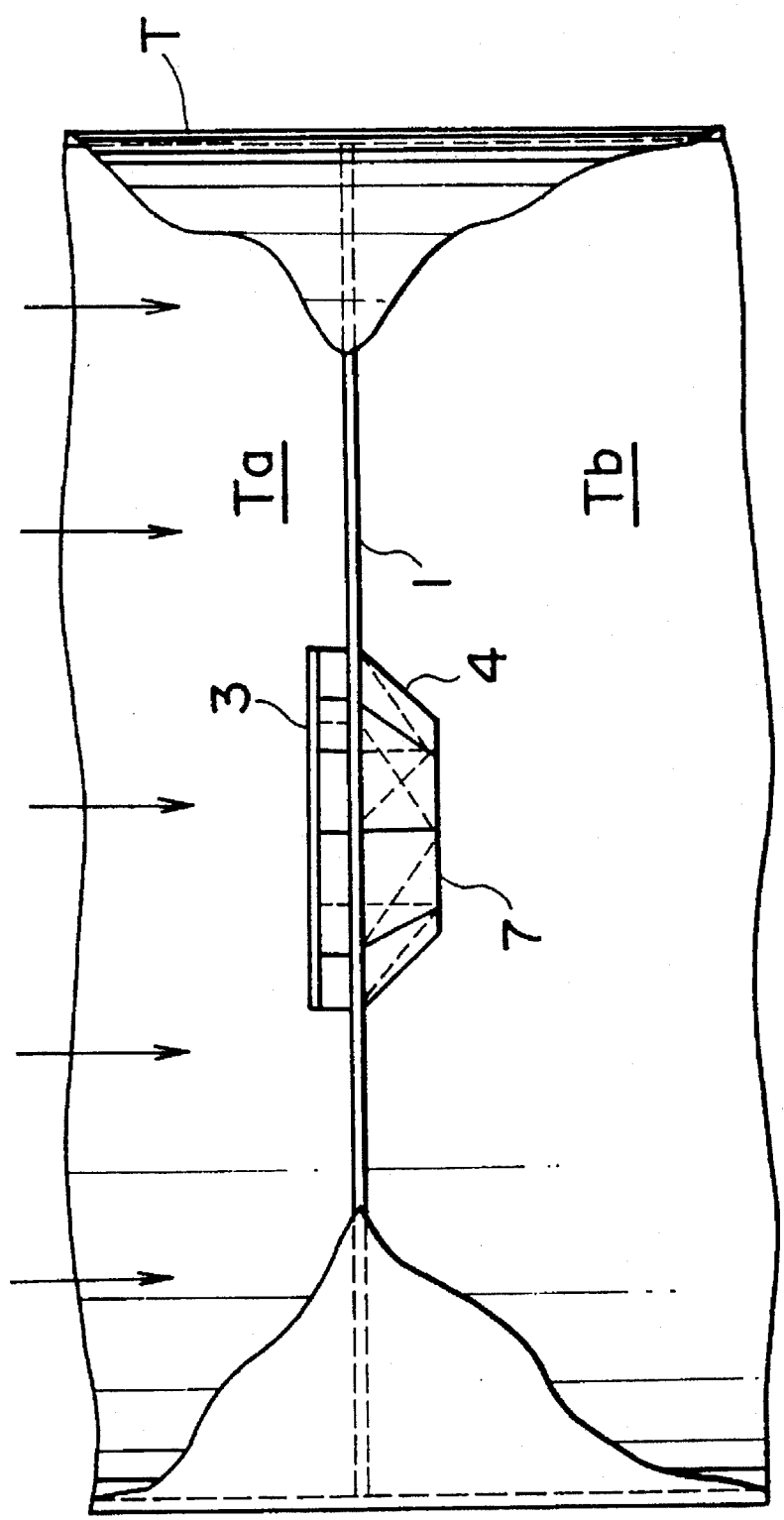
FIG. 5 is a fragmentary elevational view showing a pipe within which the device of FIG. 1 is disposed.

Referring to FIGS. 1–8 and first to FIG. 5, designated as T is a generally vertically extending pipe defining therewithin a flow space through which a liquid flows down as shown by the arrows. A flow control device according to the present invention is disposed within the pipe T for controlling the liquid flow.

Figure 6:
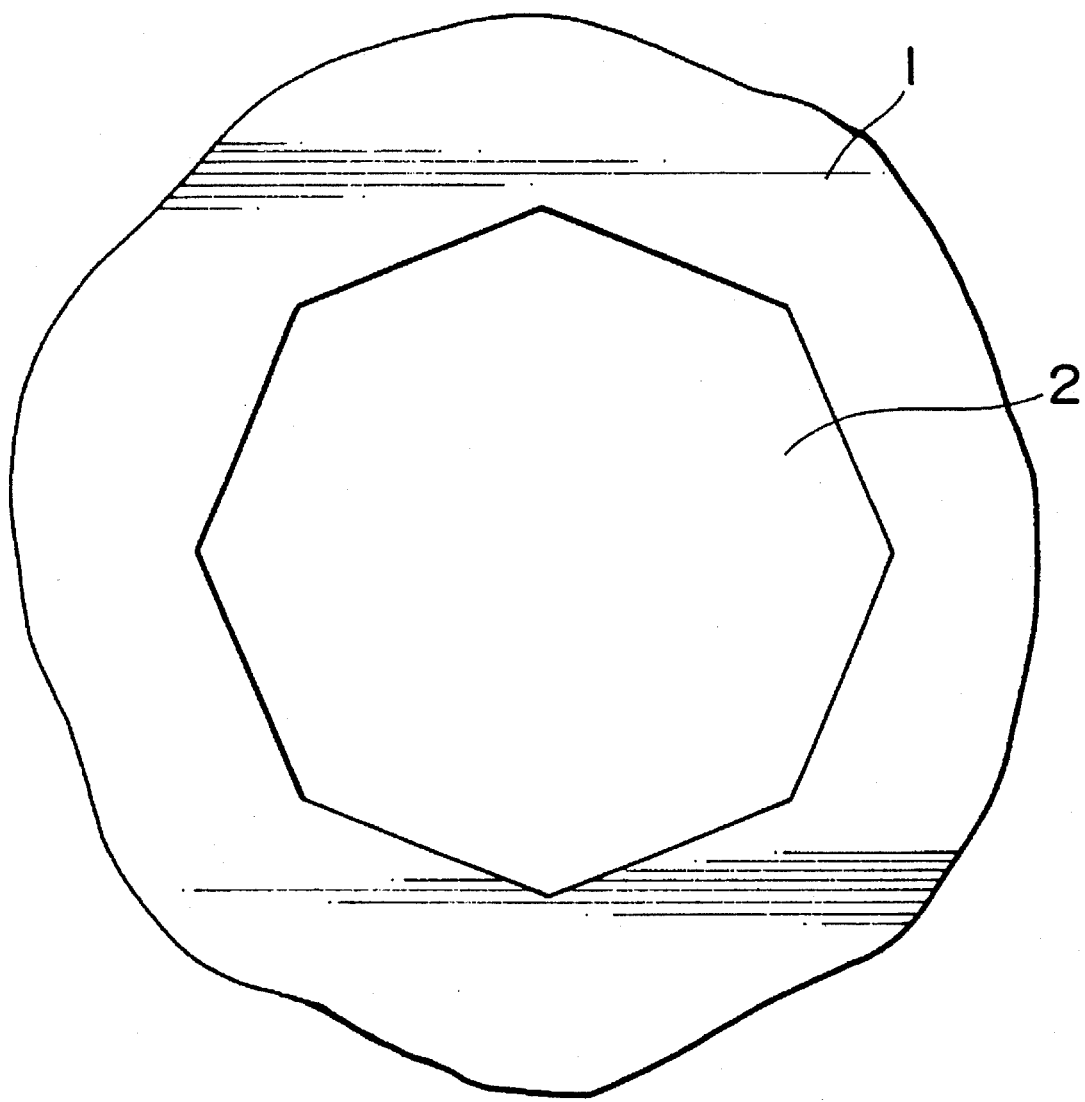
FIG. 6 is a fragmentary plan view showing an opening of a plate member of the device of FIG. 1.

The flow control device includes a plate member 1 generally horizontally disposed within the pipe T to divide the flow space into an upper space Ta and a lower space Tb and to receive the liquid flow thereon. As shown in FIG. 6, the plate member 1 has a center portion provided with an opening 2 so that the upper and lower spaces Ta and Tb are in fluid communication with each other through only the opening 2. The opening 2 in this embodiment has an octagonal shape but may be circular or polygonal.

Figure 7:
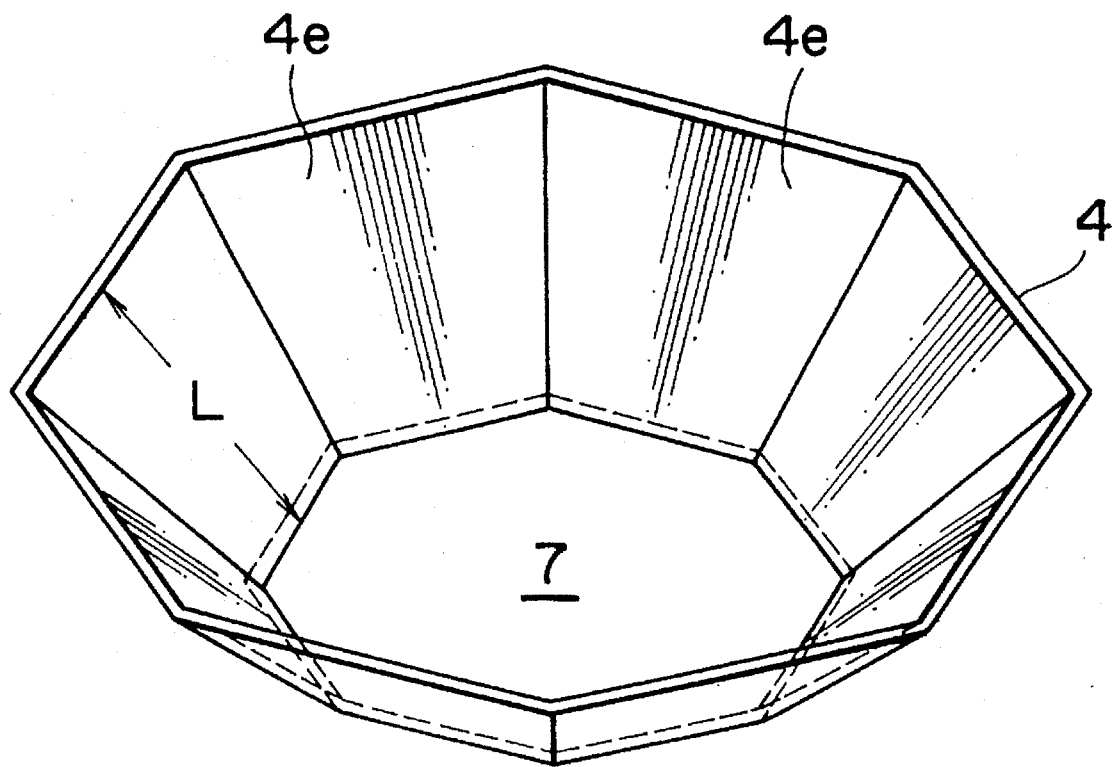
FIG. 7 is a perspective view of a guide member to be connected to the opening of FIG. 6.

As shown in FIG. 5, a guide member 4 extends downwardly and inwardly from the periphery of the opening 2 and terminates in an edge forming a liquid outlet 7 having an area smaller than that of the opening 2. In the particular embodiment shown, the guide member 4 has an octagonal cross-section which is the same shape as that of the opening 2 of the plate member 1. As best seen in FIG. 7, the guide member 4 is composed of eight trapezoidal sections 4e connected side to side in a circle. The length L of the guide member varies with the size of the flow space but is generally 3–50 cm, preferably 10–30 cm. The ratio of the area of the opening 2 of the plate member 1 to the area of the outlet 7 is generally from 6:1 to 6:5, preferably from 3:1 to 2:1. The orientation angle $\theta_2$ (FIG. 4) of the guide member 4 against the plate member 1 is generally from 20° to 70°, preferably 30° to 60°.

As shown in FIGS. 1–4, a plurality (eight in the illustrated embodiment) of preferably angularly displaced, equally spaced apart partition plate members 5 are mounted on the guide member 4. Each of the partition members 5 has a lower end 5a connected to the upper surface of the tubular guide member 4 whereby the partition members extend upwardly, generally vertically, therefrom such that the upper ends 5b thereof are located above each plate member 1. In the illustrated embodiment, the partition member 5 has a trapezoidal shape having a pair of parallel, vertically extending, shorter and longer sides 5c and 5d, an upper end 5b extending normal to the sides 5c and 5d, and a lower end 5a.

It is important that the lower end 5a of each of the partition members 5 should extend obliquely and downwardly from the periphery of the opening 2 along the surface of the tubular guide member 4. In the particular embodiment shown, the lower end 5a of each of the partition members 5 extends along the diagonal of each respective trapezoidal section constituting the tubular guide member 4 (See FIGS. 1 and 8). The orientation angle of each of the partition plate members 5 is generally such that the angle $\theta_1$, as seen on the plan view, of the lower end 5a of one partition plate member 5 against the reference line extending between the terminal edge 5e thereof and the terminal edge 5e of the adjacent plate member 5 is from 10° to 60°, preferably from 20° to 50°. In the embodiment shown in FIG. 1, the reference line coincides with one of the eight sides of the octagonal opening 2.

Provided over the partition members 5 is a cover plate member 3. In the particular embodiment shown, the cover plate member 3 is spaced apart from the horizontal plate member 1 by a distance equal to the length of the short side 5c of the partition plate member 5. Thus, there are defined a plurality of discrete passages 8 corresponding in number to the number of the partition members 5 by the cover plate member 3, the tubular guide member 4 and respective adjacent two partition plate members 5. In other words, the space between the cover plate member 3 and the tubular guide member 4 is divided by the partition plate members 5 into a plurality of passages 8. Each of the passages 8 has an inlet end portion which is in fluid communication with the upper space Ta and an outlet end portion which is in fluid communication with the lower space Tb through the outlet 7.

Figure 8:
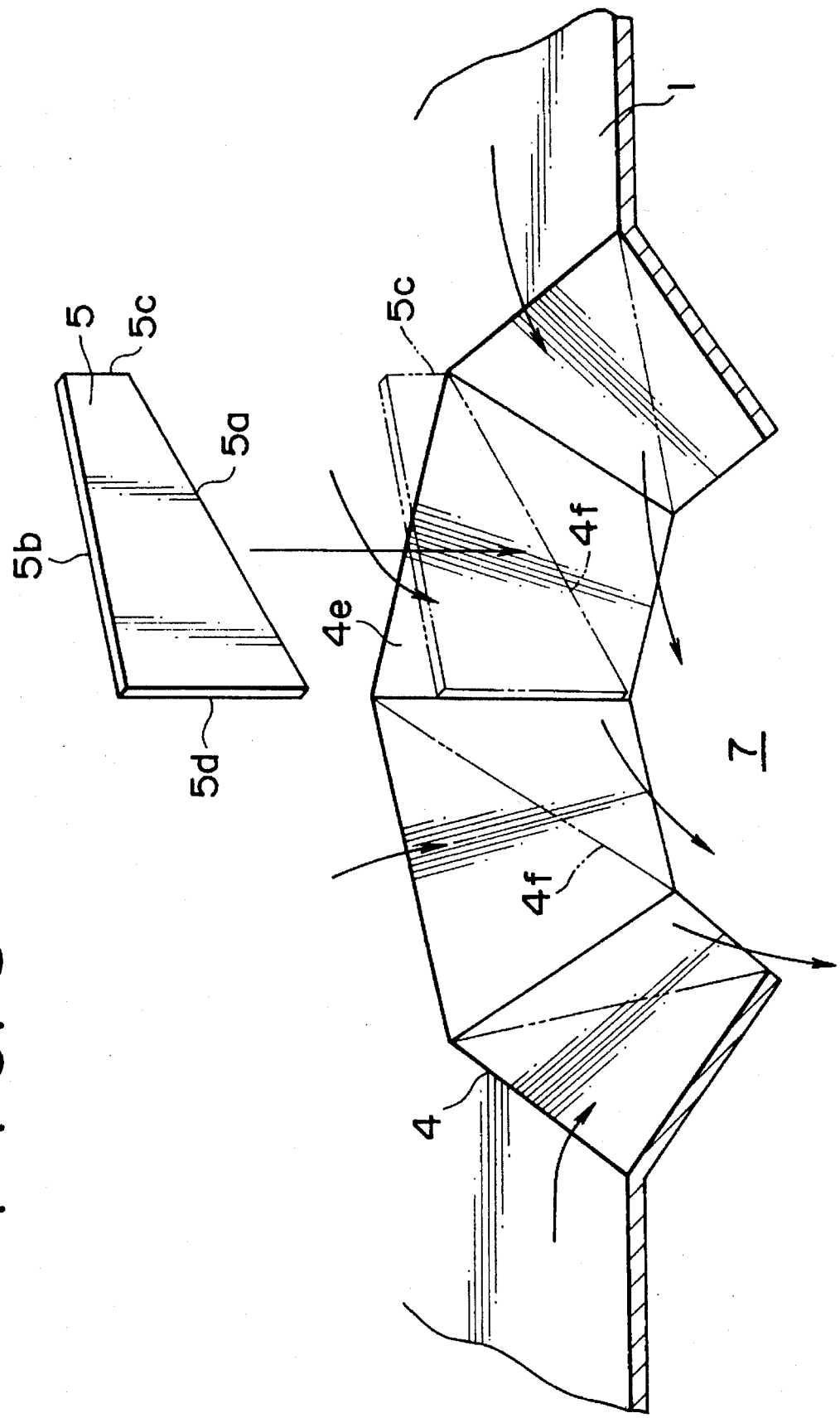
FIG. 8 is a fragmentary perspective view explanatory of attachment of a partition plate of the device of FIG. 1.
Figure 9:
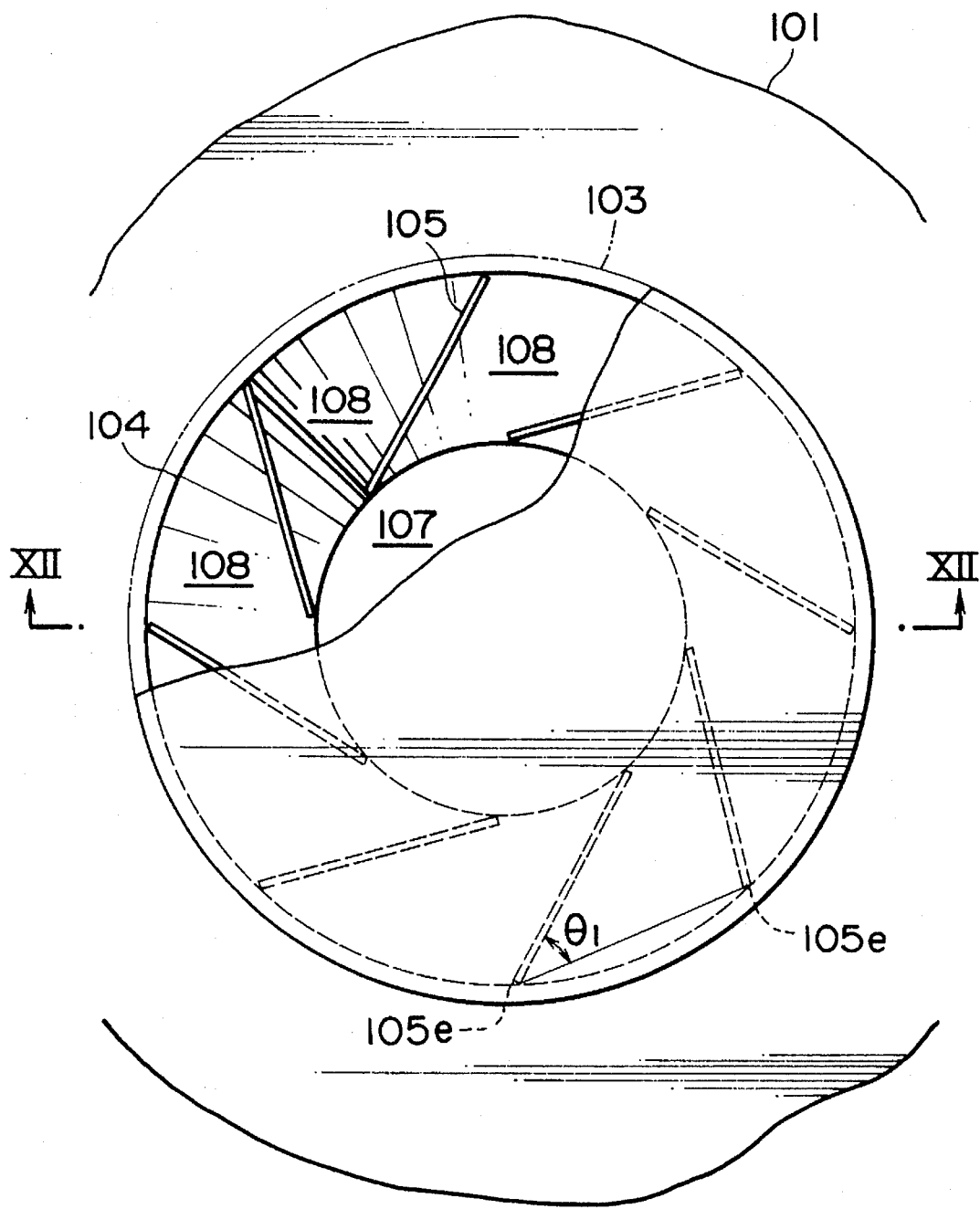
FIG. 9 is a fragmentary plan view showing another embodiment of a flow control device of the present invention.
Figure 10:
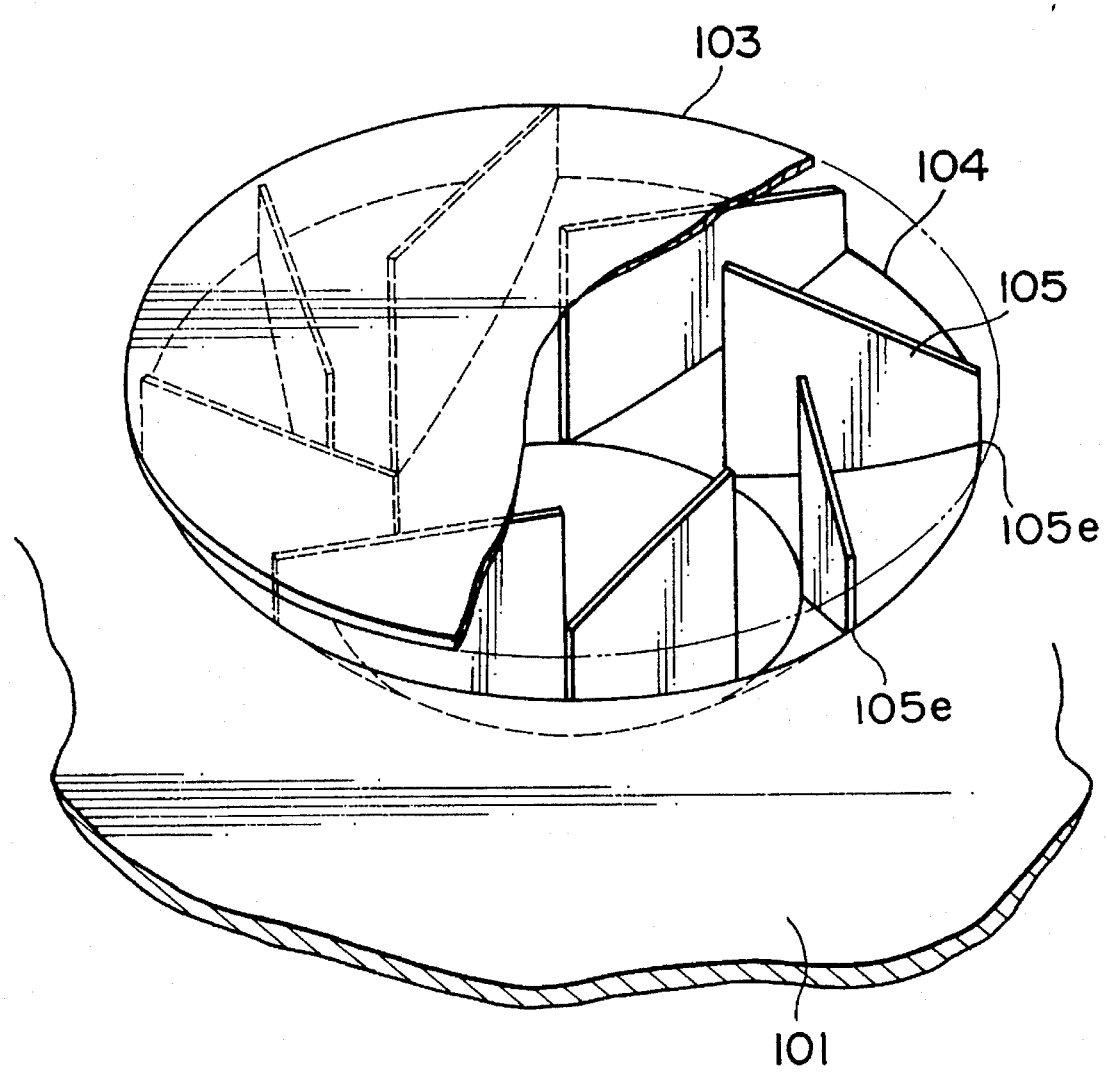
FIG. 10 is a perspective view the device of FIG. 9.
Figure 11:
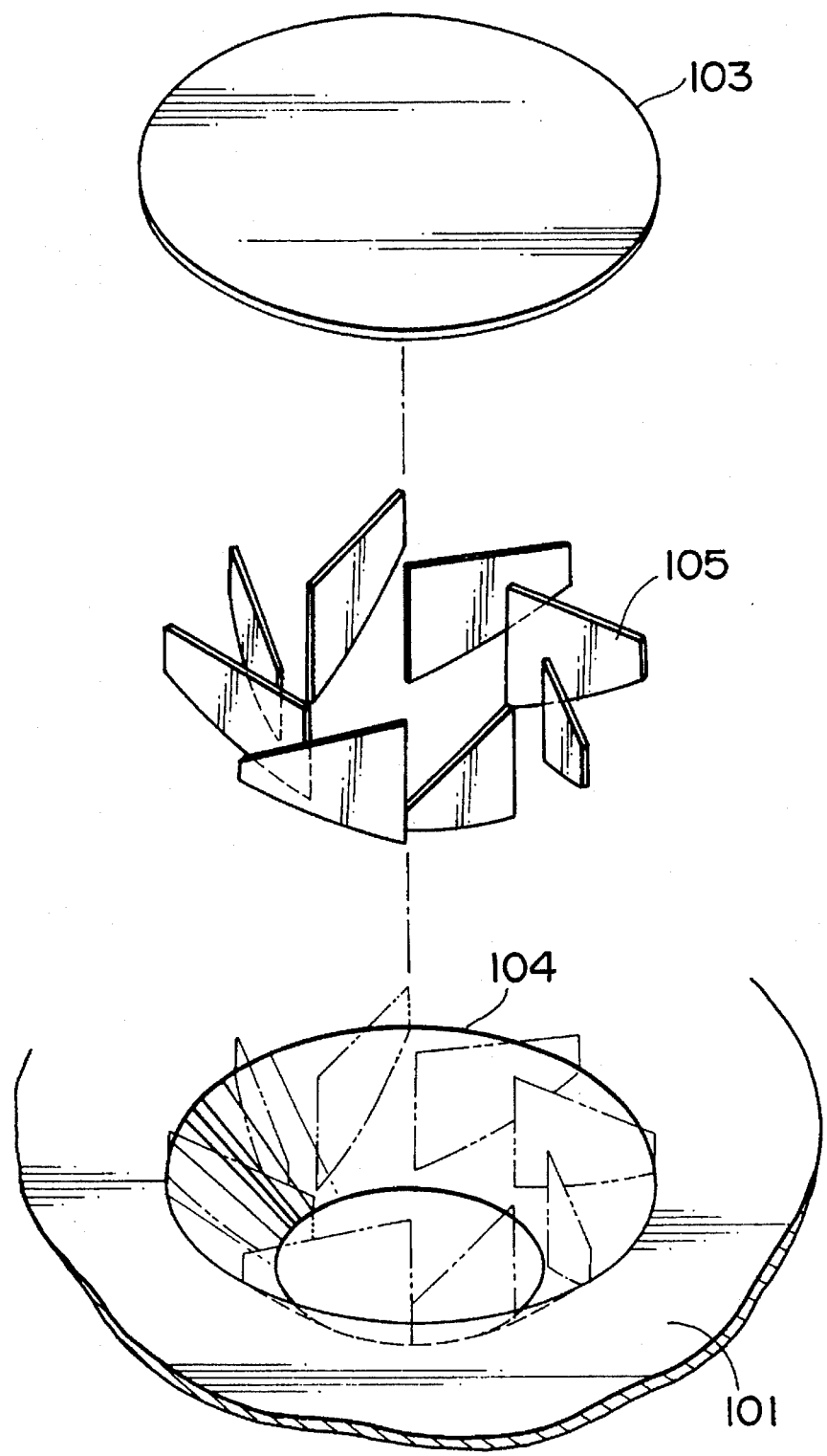
FIG. 11 is an exploded view of FIG. 10.
Figure 12:
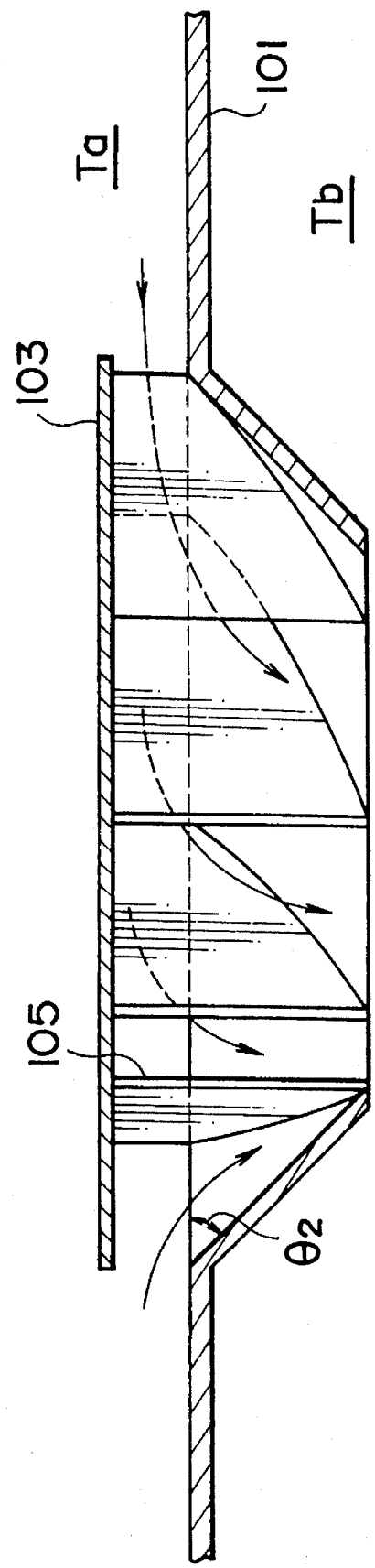
FIG. 12 is a sectional view taken on the line XII—XII in FIG. 9.

As a consequence of the above construction, the liquid flowing down within the upper space Ta is received on the cover plate member 3 and the plate member 1. The liquid on the cover plate member 3 flows down to the plate member 1. The liquid collected on the plate member 1 flows into respective passages 8 and is discharged therefrom through the outlet 7. Since each of the passages 8 is oriented in the direction deviated from the central axis of the tubular guide member 4, the liquid discharged from the passages 8 forms a vortex flow as best seen in FIG. 8. The flow control device may be formed of any suitable material such as a metal, a ceramic or a plastic.

The structure of the above fluid control device may be changed in various ways as desired. For example, for the purpose of facilitating the liquid flow through respective passages 8, the side end portions 5c and/or 5d of each of the partition plate members 5 may be bent or curved inwardly or outwardly. Further, the opening 2 of the plate member 1 may be circular or polygonal and the guide member 4 generally has a sectional shape which is the same figure as that of the opening 2. Additionally, as long as the liquid flow in the upper space Ta is prevented from directly passing through the outlet 7 without being once received on the plate member 1, the cover plate member 3 may be disposed slightly above the partition members 5. If desired, the plate member 1 may be provided with two or more openings similar to the opening 2 with each opening being provided with similar guide member, partition plates and cover plate.

FIGS. 9–15 illustrate another embodiment of the flow control device according to the present invention, in which corresponding parts are designated by the same reference numerals as part of a "100" series. This embodiment differs from the above-described first embodiment in that a circular funnel-like guide member 104 is used in place of the octagonal guide member 4.

Figure 13:
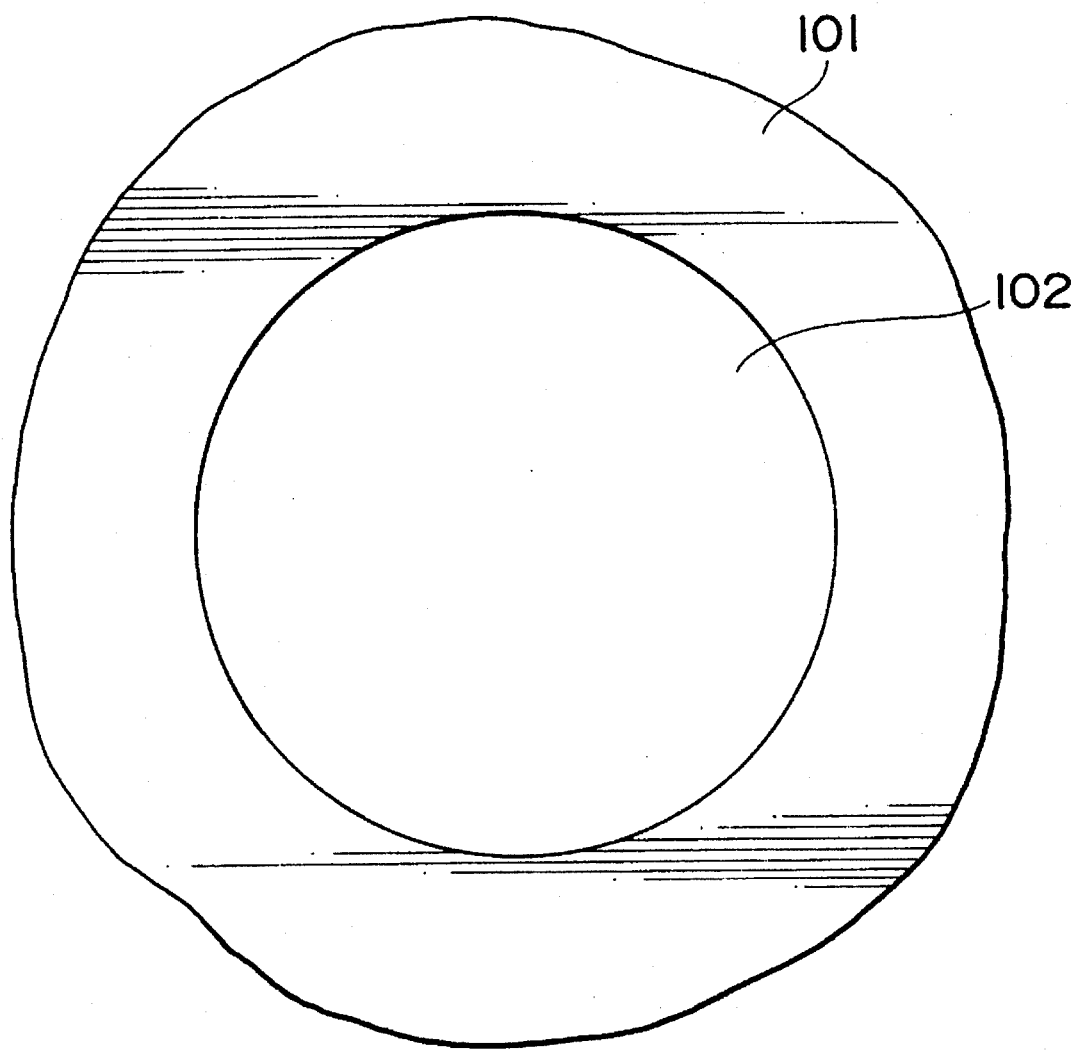
FIG. 13 is a fragmentary plan view showing an opening of a plate member of the device of FIG. 9.
Figure 14:
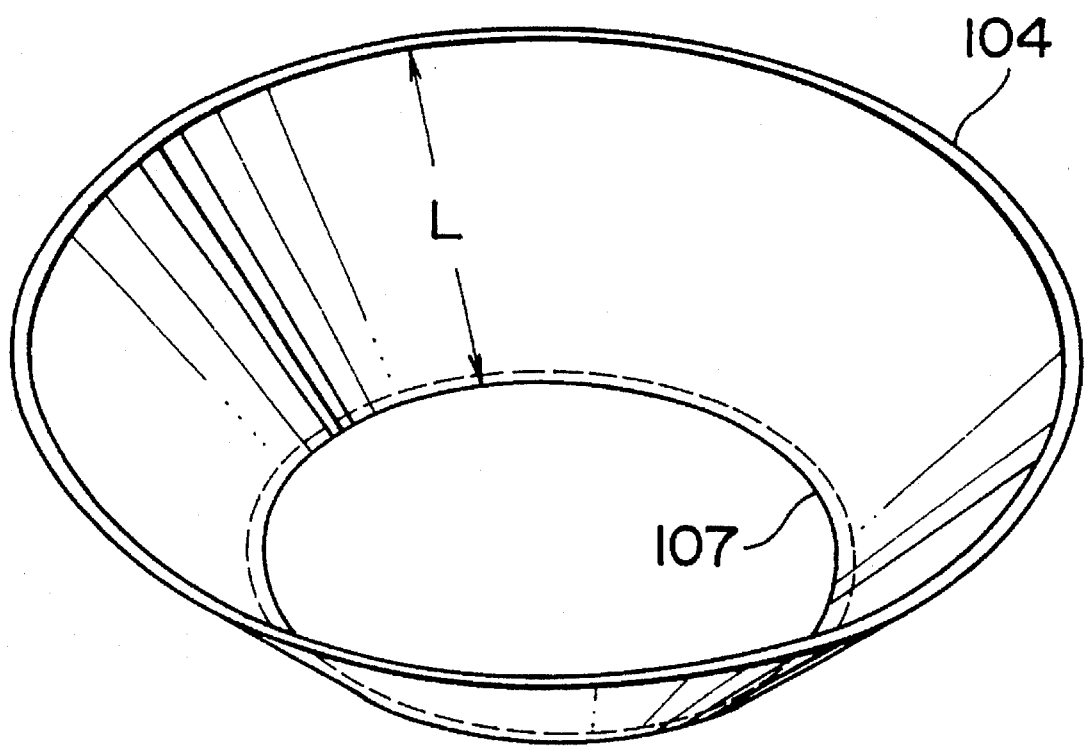
FIG. 14 is a perspective view of a guide member to be connected to the opening of FIG. 13.
Figure 15:
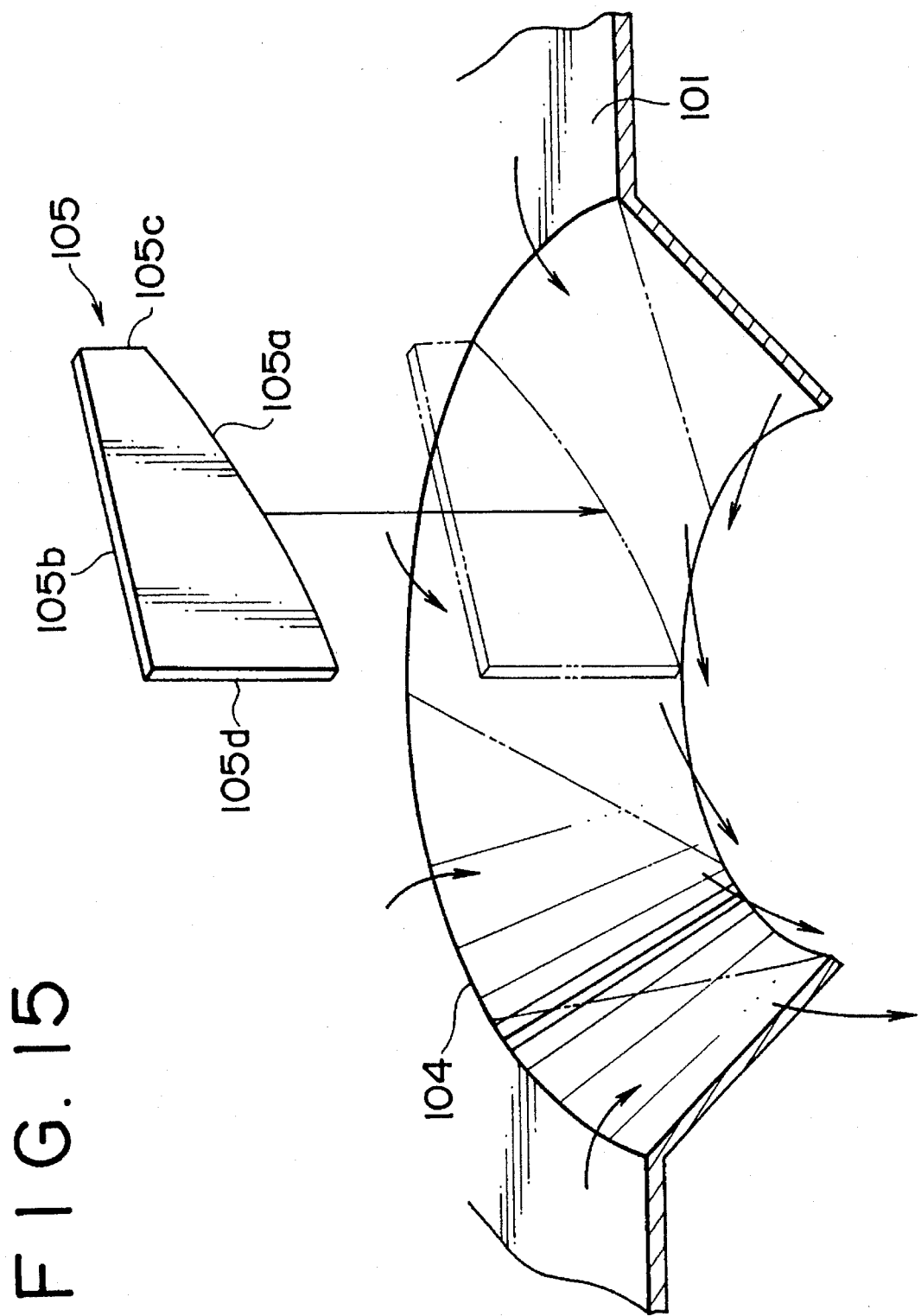
FIG. 15 is a fragmentary perspective view explanatory of attachment of a partition plate of the device of FIG. 9.

Thus, as shown in FIG. 13, a plate member 101 disposed in a liquid flowing pipe T (not shown) has a center portion provided with a circular opening 102 to which a guide member 104 as shown in FIG. 14 is connected. As shown in FIGS. 9–12, a plurality (eight in the illustrated embodiment) of preferably angularly equally spaced apart partition plate members 105 are mounted on the guide member 104. The number of the partition plate members may be 3–12, preferably 6–10. Each of the partition members 105 has a lower end 105a connected to the upper surface of the guide member 104 such that the upper end 105b thereof is located above the plate member 1 likewise in the first embodiment. The lower end 105a of each of the partition members 105 extends obliquely and downwardly from the periphery of the opening 102. A cover plate member 103 is provided over the partition members 105 so that there are defined a plurality of discrete passages 108, each of which is oriented in the direction deviated from the central axis of the tubular guide member 104. As a result, the liquid received on the plate member 101 is introduced into and discharged from the passages 8 to form a vortex flow as shown in FIG. 15.

In the liquid control device according to the present invention, vortex flow-forming passages 8, 108 are defined by the inside periphery of the tubular guide member 4, 104 and the partition plates 5, 105 mounted thereon and oriented obliquely downwardly therealong. In this case, the inside periphery of the tubular guide member serves to form the bottom walls of the liquid passages while the partition plates serve to form side walls thereof, with the inlet end thereof being in an open state. The discharge end of the liquid flow in the passages is in the condition of a free fall drop. Therefore, when the liquid flows through the vortex flow-forming passages, the energy of the vortex flow is not fully transmitted to the guide member or the partition plates, so that neither vibration nor breakage of the guide member and partition plates can occur. Thus, there is no need to provide a strong reinforcement. In addition, upon the passage of the liquid through the vortex flow-forming passages, the liquid is subjected to mixing so that homogenization thereof is attained. When the fluid is in the form of a gas-liquid mixture, therefore, the liquid and gas components undergo sufficient gas-liquid contact to form a uniform mixture. For the purpose of accelerating the mixing action by the vortex flow-forming passages, the size thereof may be arranged so as to obtain a linear velocity sufficient to obtain a turbulent flow therein.

With the liquid flow control device according to the present invention, the liquid flow in the pipe is collected in the vortex flow-forming passages and discharged from the lower ends thereof as a downwardly flowing vortex flow. During the course of the collection and vortex formation, the liquid is subjected to mixing so that the liquid which flows down in the form of a vortex flow has a uniform composition at any position.

When the fluid flow is in the form of a gas-liquid mixture, the liquid and gas components undergo sufficient gas-liquid contact during the passage through the flow control device according to the present invention, so that heat exchange therebetween may be effectively performed and, additionally, absorption of the gas into the liquid and dissolution of specific substances entrained in the gas into the liquid may be efficiently performed. Furthermore, since the vortex flow occurring beneath the outlet of the guide member is so shaped as to form a space therewithin and since the gas components which have been introduced from the vortex flow-forming passages into that space can be again brought into contact with the liquid film of the vortex flow, the gas-liquid contact which results in heat exchange, or the like, permits physical or chemical interaction to effectively take place. Thus, with the flow control device of the present invention, gas-liquid contact of the gas-liquid mixture flowing down within the pipe can be efficiently effected. It follows, therefore that the flow control device of the present invention can also function as a gas-liquid contacting device.

The flow control device of the present invention is also effective as a counter current flow-type gas-liquid contacting device, in which an upwardly flowing gas is contacted with the downwardly flowing liquid vortex flow. The gas after the contact with the vortex flow in the lower space (Tb in FIG. 5) is introduced into the vortex flow-forming passages and discharged therefrom to the upper space (Ta in FIG. 5).

With the control device according to the present invention, a liquid pool is not formed on the liquid-receiving plate member 1, 101 even when the flow rate of the liquid flow is high. Thus, the liquid received on the plate member is immediately collected in and discharged from the vortex flow-forming passages so that the passages are in an open state rather than a closed state. This permits the flow of the liquid, while preventing the dynamic energy of the vortex flow from being transmitted to the guide member or the partition plates, giving the merits that no vibration or breakage of the guide member and the partition plates is caused and that the pressure loss during the passage through the vortex flow-forming passages is very small.

Various kinds of liquid-liquid and gas-liquid contacting apparatuses of a type in which a plurality of packed beds or plates for effecting such a contact are disposed in a tubular body are known, such as reactors, absorbing towers, diffusing towers, cooling towers and distillation towers. In these contacting devices, the liquid is allowed to flow downwardly while the gas flows co-currently or counter-currently therewith. A distributing member is generally disposed between adjacent two beds or plates for evenly distributing the liquid from the upper bed or plate to the lower one. Such a distributing member is also effectively utilizable in the present invention for the purpose of improving the homogeneity of the liquid flow and the gas-liquid or liquid-liquid contacting efficiency. Illustrative of suitable distributing members are porous plates, perforated plates, chimney-type distributing plates and bubble cap-type distributing plates. These plates may be used by themselves or in combinations of two or more.

Figure 1:
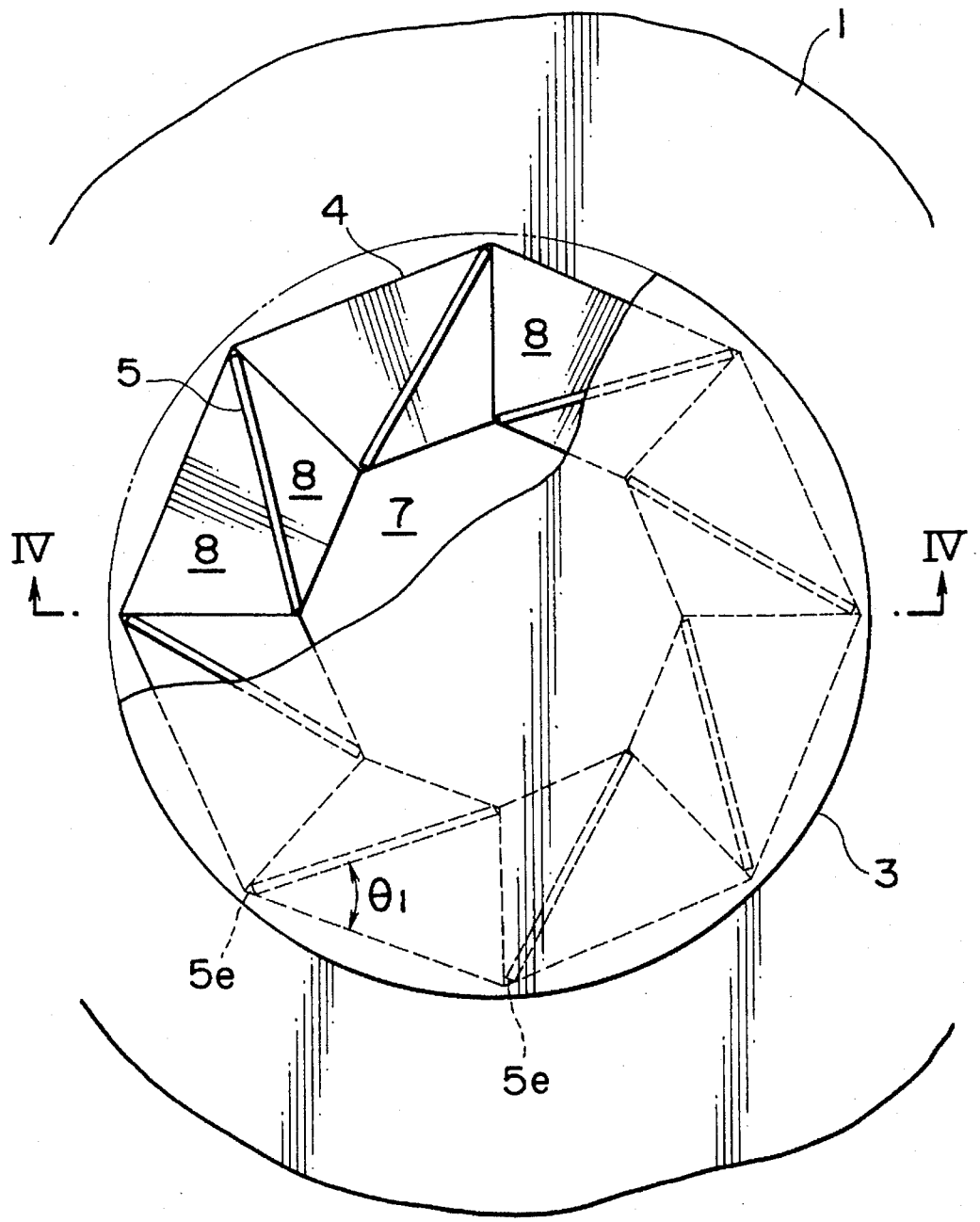
FIG. 1 is a fragmentary plan view showing one embodiment of a flow control device of the present invention.
Figure 2:
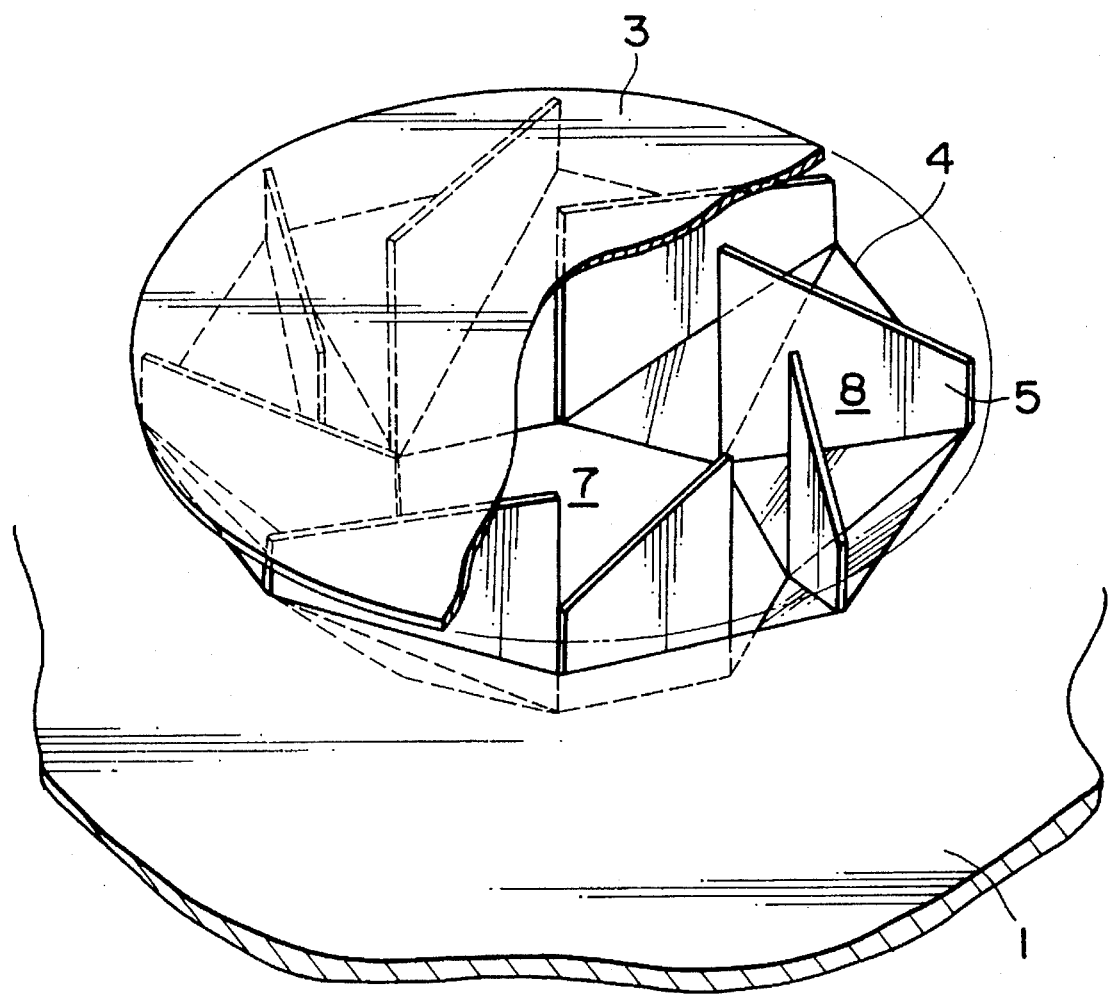
FIG. 2 is a perspective view the device of FIG. 1.
Figure 3:
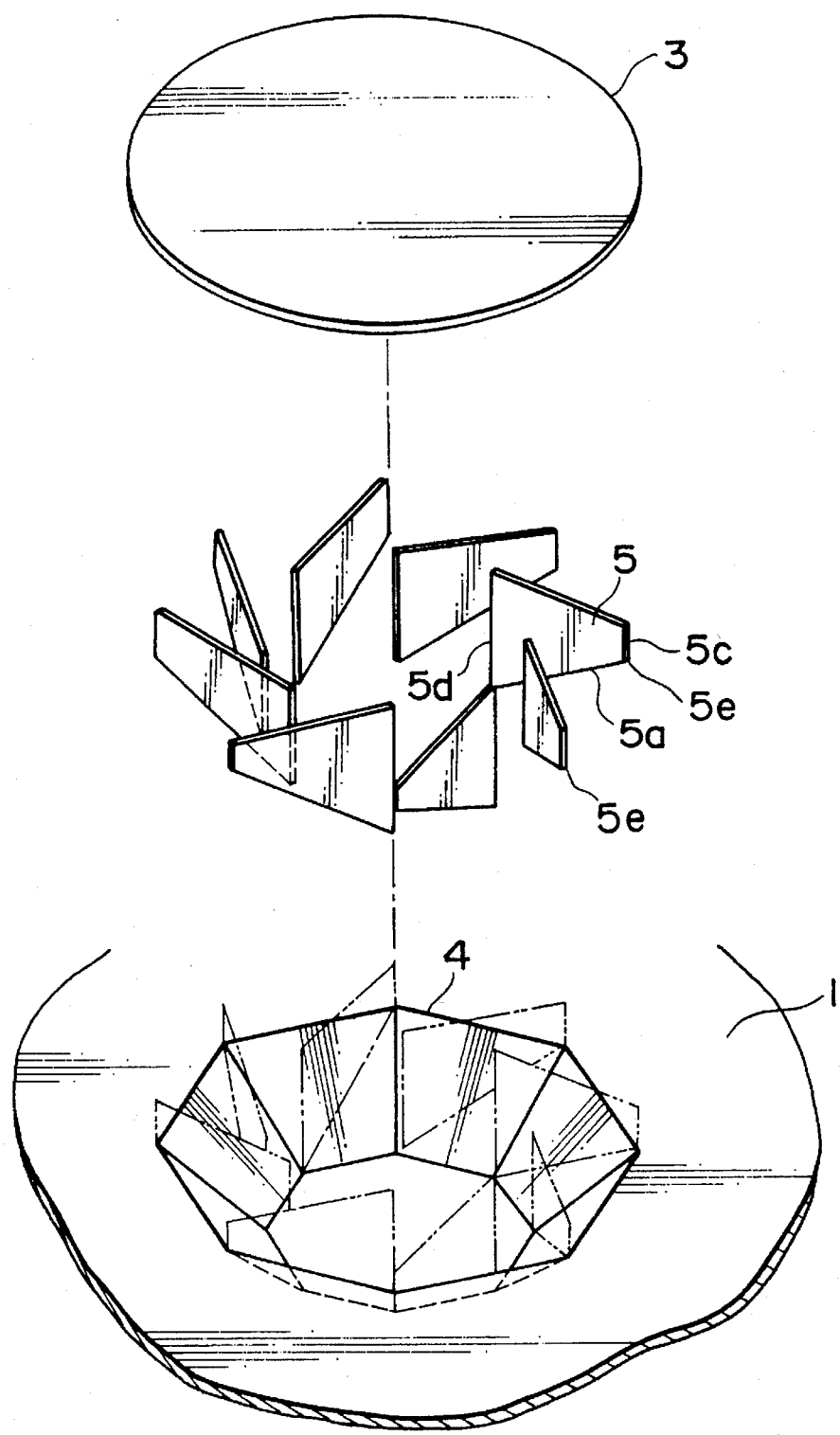
FIG. 3 is an exploded view of FIG. 2.
Figure 4:
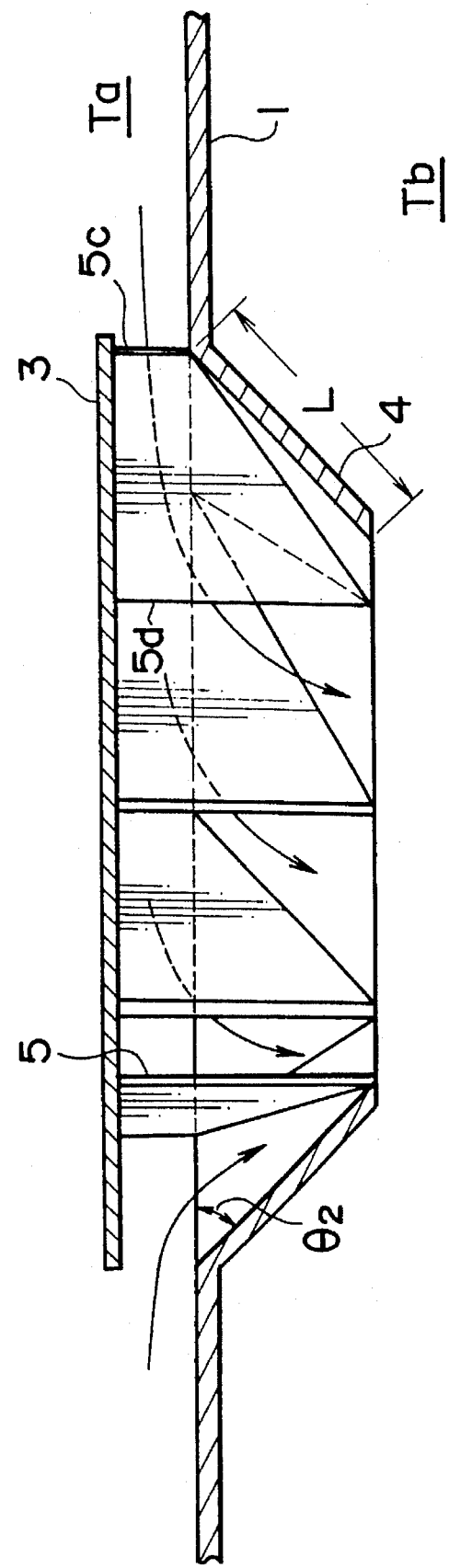
FIG. 4 is a sectional view taken on the line IV—IV in FIG. 1.
Figure 16:
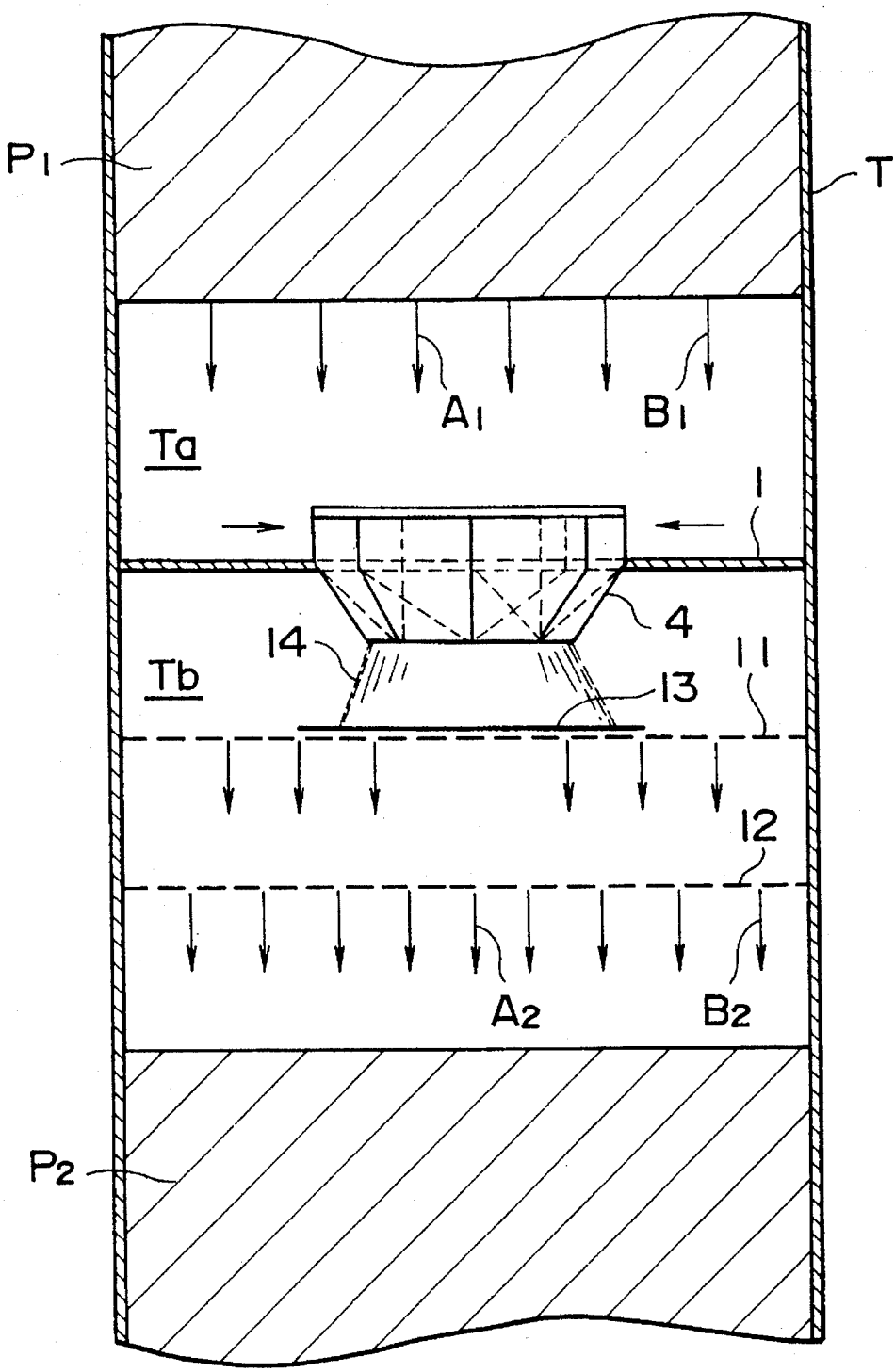
FIG. 16 is a fragmentary, cross-sectional, elevational view showing a reactor having a flow control device of the present invention.

FIG. 16 depicts one embodiment of a contacting apparatus equipped with an assembly as shown in FIG. 1. The flow control device in this embodiment additionally includes distributor disposed in the lower space Tb beneath the plate member 1. The distributor is composed of a pair of upper and lower horizontal perforated plates 11 and 12. The upper perforated plate 11 has perforations whose diameter is smaller than that of the lower perforated plate 12. A baffle plate 13 is disposed above the upper perforated plate 11 for laterally outwardly directing the vortex flow 14 discharged from the guide member 4. Designated as P1 and P2 are upper and lower packed beds.

A liquid flow (which may be a gas-liquid mixture) is discharged from the packed bed P1 flows down through the upper space Ta as shown by the arrows A1 and B1. The liquid flow A1 from the central portion of the packed bed P1 has a composition which differs from that of the liquid flow B1 discharged from the peripheral portion of the packed bed P1. When the liquid flow is in the form of a gas-liquid mixture, the absorbed gas/liquid ratio of the flow A1 also differs from that of the flow B1.

The liquid flow is received on the plate member 1 and is then discharged from the outlet of the guide member 4 in the form of a vortex flow 14 having improved homogeneity. The vortex flow is collected on the upper perforated plate 11 to form a liquid pool. The collected liquid which is swirling on the plate 11 by the action of the vortex flow is then passed through respective perforations of the plate 11 and is received on the lower perforated plate 12 to form a liquid pool thereon. The liquid discharged from the plate 11 has much improved homogeneity.

The liquid collected on the plate 12 having much more improved homogeneity passes through the perforations of thereof and is then allowed to flow through the packed bed P2. The amount and composition of the liquid discharged from the center portion of the plate 12 as shown by the arrow A2 are substantially the same as those from the peripheral portion as shown by the arrow B2.

If desired, means for feeding a gas or liquid cooling or warming medium to the upper space Ta for contact with the liquid flow A1 and B1 may be provided. The cooling or warming of the liquid flow may be effectively carried out.

Figure 17:
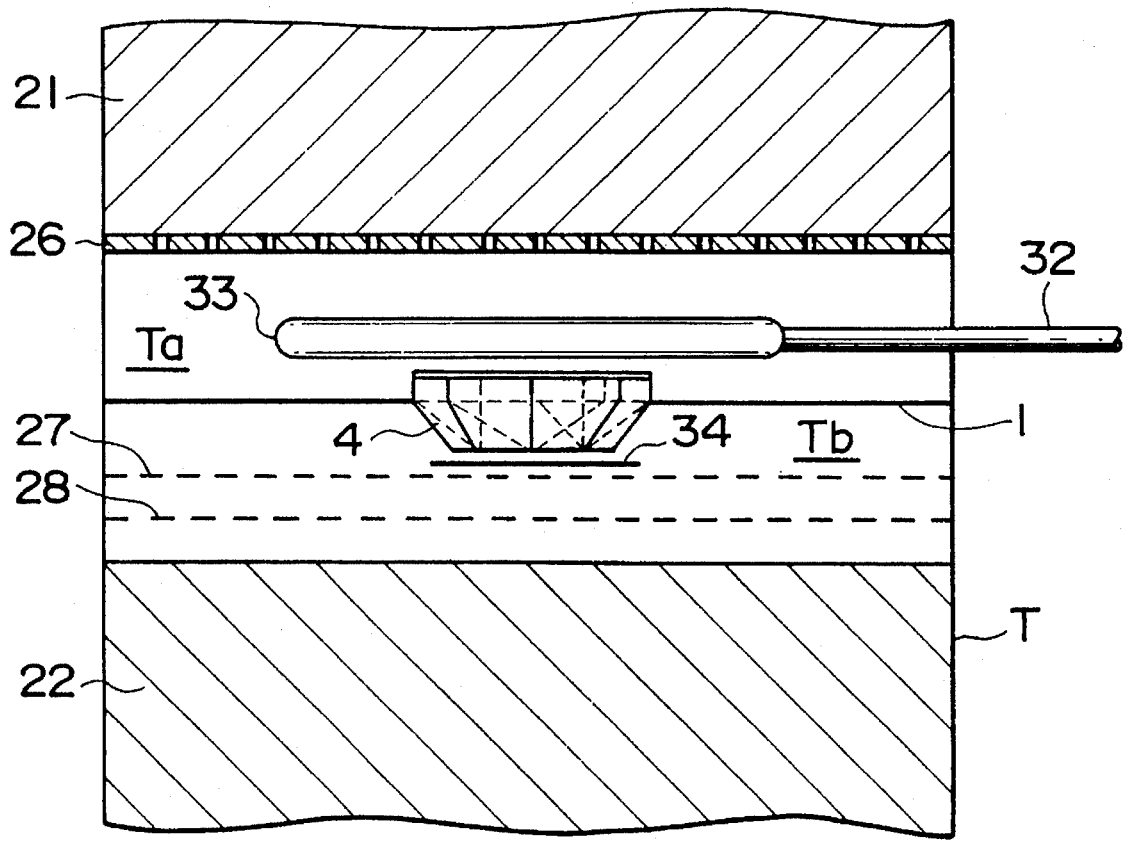
FIG. 17 is a fragmentary, cross-sectional, elevational view showing another reactor having a flow control device of the present invention.

FIG. 17 diagrammatically illustrates a catalytic hydrogenating reactor which has a plurality (two in the illustrated case) of packed beds 21 and 22 of hydrogenating catalysts for hydrogenating a hydrocarbon oil and which is equipped with the flow control device according to the present invention. The catalyst may be a particulate composite catalyst composed of a porous inorganic carrier, such as alumina, silica, titania, boria, zirconia, silica-alumina, silica-magnesia, alumina-titania, alumina-magnesia, alumina-boria or alumina-zirconia, and a catalytic metal component, such as chromium, molybdenum, tungsten, cobalt or a mixture thereof, supported on the carrier. The catalyst bed 21 is supported on a support grid 26 having a multiplicity of openings. The catalyst bed 22, too, is supported on a similar grid (not shown).

Disposed between the catalyst beds 21 and 22 is a flow control device of the present invention including the plate member 1 and the guide member 4 of FIG. 1. In the lower space Tb defined between the plate member 1 and the catalyst bed 22, there are disposed two perforated plates 27 and 28 each adapted for radially evenly distributing a gas-liquid mixture collected thereon. The diameter of the perforations of the plate 27 is from 5 to 50 mm while that of the plate 28 is from 5 to 30 mm. The plate 27 serves to distribute a gas-liquid mixture collected thereon roughly evenly while the plate 28 serves to more evenly distribute. Designated as 34 is a baffle plate.

Provided in the space Ta defined between the plate member 1 and the catalyst bed 21 is a quench ring 33 connected to a quenching gas feed pipe 32. The quench ring 33 is formed from a pipe having a multiplicity of gas injection holes. A quenching gas such as hydrogen supplied from the feed pipe 32 is injected from the quench ring 33 into the flow of a gas-liquid mixture discharged from the catalyst bed 21 so that the gas-liquid mixture is quenched therewith.

The above reactor operates as follows. A mixture of a raw material hydrocarbon oil with a hydrogen gas is allowed to flow down through the catalyst bed 21 at a temperature of 300°–450° C. and a pressure of 50–200 kg/cm$^2$G so that the hydrocarbon oil is decomposed and hydrogenated while impurities such as sulfur components and nitrogen components contained in the hydrocarbon oil are catalytically converted into gases such as hydrogen sulfide and ammonia. The resulting hydrogenated product in the form of a mixture of a liquid (including the hydrogenated oil) and a gas (including hydrogen, ammonia, hydrogen sulfide and hydrocarbons (e.g. methane and ethane)) is discharged from the catalyst bed 21 to the space Ta where the mixture is quenched by direct contact with the quenching gas (e.g. hydrogen) injected from the quench ring 33.

The quenched mixture is collected on the plate member 1 and discharged from the bottom of the guide member 4 in the form of a vortex flow. This is converted into a multiplicity of evenly distributed flows upon passage through the perforated plates 27 and 28 and is allowed to pass through the catalyst bed 22 where the mixture is further subjected to a catalytic hydrogenation treatment. The product is then subjected to a gas-liquid separation treatment and the separated liquid is subjected to a distillation treatment in a conventional manner.

Since the hydrogenating reaction of the hydrocarbon oil is exothermic, the reaction product mixture discharged from the catalyst bed 21 has a high temperature. Therefore, if the mixture is introduced as such into the succeeding catalyst bed 22, a large amount of coke will be formed to cause deactivation of the catalyst and run away reactions will be caused. Namely, without the quenching, there is a danger that the hydrogenation fails to be satisfactorily effected in the succeeding hydrogenating stage in the catalyst bed 22.

Because of non-uniformity in packing density of the catalyst, the liquid flow paths formed in the catalyst bed 21 are not uniformly distributed. This follows that the hydrogenation proceeds in different degrees at different portions of the catalyst bed 21. As a consequence, the composition of the hydrotreated mixture at one location of a horizontal plane in the space Ta differs from that of the hydrotreated mixture at another location of the same plane. Such a non-uniformity of the composition of the hydrotreated mixture is cured during the passage thereof through the plate member 1, the guide member 4 and the perforated plates 27 and 28. Also, the quenching gas is homogeneously mixed with the hydrotreated mixture during the passage through the above-described control device. Therefore, the flow of the mixture beneath the perforated plate 28 is uniform in amount, in temperature, in composition throughout the horizontal cross-section thereof, so that the hydrogenation can be efficiently carried out with the reactor of the present invention.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all the changes which come within the meaning and range of equivalency of the claims are therefore intended to be embraced therein.

What is claimed is:

1. A device for controlling a liquid flow in a generally vertically extending pipe, comprising:

a plate member arranged in said pipe generally perpendicular to the axis thereof and having an opening therethrough disposed so that the liquid conducted by said pipe is permitted to pass said plate member only through said opening;

a tubular guide member formed in said plate member by a wall extending downwardly and inwardly from the periphery of said opening and terminating in an edge operative to form a liquid outlet having a flow area smaller than that of said opening;

a plurality of flow-directing partition members each having a lower end connected to said tubular guide member and an upper end projecting upwardly from the periphery of said opening, said lower end of each of said partition members extending obliquely downwardly from the periphery of said opening along the wall of said tubular guide member substantially to the outlet to define on said tubular guide member a plurality of flow-conducting passages corresponding in number to the number of said partition members and being in fluid communication with said liquid outlet; and a fluid obstruction cover plate member covering said plurality of passages, and cooperating with said plate member so that the liquid flow through said pipe is directed through said passages and is discharged from said liquid outlet in the form of a vortex flow.

2. A device as claimed in claim 1, wherein said cover plate has a lower side to which said upper end of each of said partition members is connected.

3. A device as claimed in claim 1, wherein said opening in said plate member and the cross-section of said guide member has a circular shape.

4. A device as claimed in claim 1, wherein said opening in said plate member and the cross-section of said guide member has a polygonal shape.

5. A device as claimed in claim 4, wherein said guide member is octagonal in cross-section and is composed of eight trapezoidal sections connected side to side in a circle and wherein the lower end of each of said partition members extends along a diagonal of each respective trapezoid section.

6. A device as claimed in claim 1, further comprising distributing means disposed beneath said plate member for receiving said vortex flow and dividing same into a multiplicity of streams.

7. A device as claimed in claim 1, wherein said distributing means includes one or more perforated plates.

8. A device as claimed in claim 1, further comprising means disposed above said cover plate member for injecting a fluid into said liquid flow.

9. A device as claimed in claim 6, further comprising means disposed above said cover plate member for injecting a fluid into said liquid flow to control the temperature of said liquid flow.

10. A device according to claim 9 in a reactor having upper and lower catalyst beds and wherein said device is interposed between said upper and lower catalyst beds, whereby the liquid flow discharged from said upper catalyst bed is distributed by said device and then introduced into said lower catalyst bed.

11. A device as claimed in claim 10, wherein each of said upper and lower catalyst beds in said reactor contains a hydrogenating catalyst.

* * * * *